(12) United States Patent
Asawa

(10) Patent No.: US 11,962,888 B2
(45) Date of Patent: Apr. 16, 2024

(54) IMAGING APPARATUS WITH FOCUS OPERATION DISPLAY INFORMATION

(71) Applicant: Panasonic Intellectual Property Management Co., Ltd., Osaka (JP)

(72) Inventor: Tatsuyoshi Asawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/940,187

(22) Filed: Sep. 8, 2022

(65) Prior Publication Data

US 2023/0097922 A1 Mar. 30, 2023

(30) Foreign Application Priority Data

Sep. 17, 2021 (JP) .................................. 2021-152299

(51) Int. Cl.
*H04N 23/62* (2023.01)
*H04N 23/63* (2023.01)
*H04N 23/67* (2023.01)

(52) U.S. Cl.
CPC .......... *H04N 23/62* (2023.01); *H04N 23/631* (2023.01); *H04N 23/675* (2023.01)

(58) Field of Classification Search
CPC ..... H04N 23/62; H04N 23/631; H04N 23/675
See application file for complete search history.

(56) References Cited

U.S. PATENT DOCUMENTS

| 2002/0080257 | A1* | 6/2002 | Blank | H04N 23/62 |
| | | | | 348/E5.045 |
| 2012/0212661 | A1 | 8/2012 | Yamaguchi et al. | |
| 2015/0227303 | A1 | 8/2015 | Sudo et al. | |
| 2019/0197666 | A1* | 6/2019 | Oikkonen | G06T 3/4038 |
| 2020/0073205 | A1* | 3/2020 | Matsushima | H04N 23/62 |

FOREIGN PATENT DOCUMENTS

| JP | 2012-173531 A | 9/2012 |
| JP | 2015-118295 A | 6/2015 |
| JP | 2017-015871 A | 1/2017 |
| JP | 2017-076433 A | 4/2017 |
| JP | 2019-149603 A | 9/2019 |
| JP | 2020-053721 A | 4/2020 |

* cited by examiner

*Primary Examiner* — Christopher K Peterson
(74) *Attorney, Agent, or Firm* — Renner, Otto, Boisselle & Sklar, LLP

(57) ABSTRACT

An imaging apparatus includes: an image sensor that captures a subject image via an optical system including a focus lens, to generate image data; a display that displays a moving image indicated by the image data; a user interface allowing to input user operation; and a controller that controls focusing operation using the focus lens, based on the user operation input to the user interface. The controller controls the display to display operation information together with the moving image, the operation information indicating a setting value related to a speed at which the focusing operation is executed, and responds to first operation via the user interface to adjust the setting value indicated by the operation information, and responds to second operation via the user interface to execute the focusing operation in accordance with the setting value indicated by the displayed operation information together with the moving image.

8 Claims, 12 Drawing Sheets

IMAGING APPARATUS WITH FOCUS OPERATION DISPLAY INFORMATION

BACKGROUND

1. Technical Field

The present disclosure relates to an imaging apparatus that performs focusing operation.

2. Related Art

JP 2017-15871 A discloses a focus control device that is advantageous for autofocus (AF) during moving image shooting. The focus control device starts driving of an optical element at a first driving speed based on a first defocus amount and focusing time of a subject calculated before start of driving in focus control, and changes a driving speed of the optical element to a second driving speed based on a second defocus amount and focusing time of the subject calculated after the start. According to JP 2017-15871 A, even when a defocus amount at the start of AF is a large value, AF can be completed in focusing time desired by the user.

JP 2020-53721 A discloses an imaging control device that performs focus adjustment in response to touch operation. The imaging control device determines a target of focus adjustment on the basis of first touch operation on a live view image, and controls AF such that the determined target of focus adjustment is focused based on a speed according to a movement speed or a movement amount of a touch position in second touch operation after the first touch operation. An object of JP 2020-53721 A is to enable easy setting of a driving speed at the time of focus adjustment by touch operation.

SUMMARY

The present disclosure provides an imaging apparatus that can allow the user to easily make setting regarding a speed at which focusing operation is executed.

An imaging apparatus according to the present disclosure includes an image sensor that captures a subject image via an optical system including a focus lens to generate image data, a display that displays a moving image indicated by the image data, a user interface allowing to input user operation, and a controller that controls focusing operation using the focus lens, based on the operation input to the user interface. The controller controls the display to display operation information, which indicates a setting value related to a speed at which the focusing operation is executed, together with a moving image, and responds to first operation via the user interface to adjust a setting value indicated by the operation information and responds to second operation via the user interface to execute the focusing operation according to the setting value indicated by operation information displayed together with the moving image.

According to the imaging apparatus of the present disclosure, it is possible to facilitate setting regarding a speed at which focusing operation is executed for the user.

DETAILED DESCRIPTION

First Embodiment

Hereinafter, the configuration and operation of a digital camera being an embodiment of an imaging apparatus according to the present disclosure will be described.

1. Configuration

Figure 1:
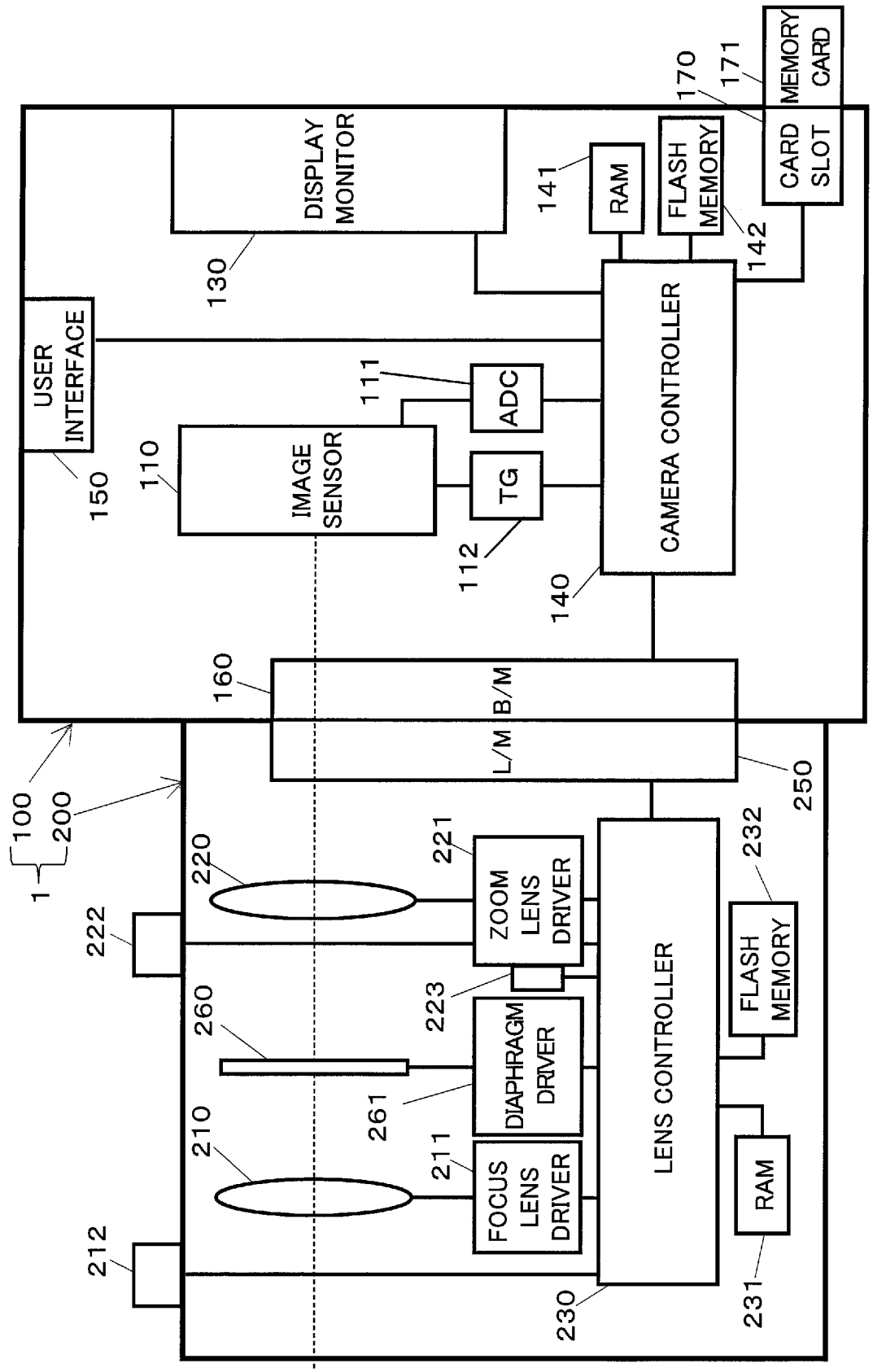
FIG. 1 is a block diagram showing a configuration of a digital camera according to a first embodiment of the present disclosure.

FIG. 1 is a block diagram showing the configuration of a digital camera 1 according to the first embodiment. The digital camera 1 of the present embodiment includes a camera body 100 and an interchangeable lens 200 attachable thereto and detachable therefrom.

1-1. Camera Body

The camera body 100 (an example of the imaging apparatus) includes an image sensor 110, a display monitor 130, a user interface 150, a camera controller 140, a RAM 141, a flash memory 142, a body mount 160, and a card slot 170.

The image sensor 110 is an element that captures a subject image incident through the interchangeable lens 200 to generate image data. The image sensor 110 is a CMOS image sensor, for example. The generated image data is digitized by an AD converter 111. Predetermined image processing is performed on the digitized image data by the camera controller 140. The predetermined image processing includes gamma correction processing, white balance correction processing, flaw correction processing, YC conversion processing, electronic zoom processing, and JPEG compression processing, for example. The image sensor 110 may be a CCD image sensor, an NMOS image sensor, or the like.

The image sensor 110 operates at the timing controlled by the timing generator 112. The image sensor 110 generates a still image or a moving image for recording, or a live view image. The live view image is an example of a moving image displayed on the display monitor 130 in order to visualize a real-time imaging result by the image sensor 110 to the user.

The image sensor 110 of the present embodiment includes a plurality of sensor pixels for realizing an AF function of an image surface phase detection method, for example. The plurality of the sensor pixels are arranged at various positions on an image surface of the image sensor 110, the positions being targets for detecting a focusing state in the AF function of the image surface phase detection method. For example, the sensor pixel includes a photoelectric conversion portion divided so as to form two optical images obtained by pupil division in an optical system such as the interchangeable lens 200.

The display monitor 130 is an example of a display that displays an image such as a live view image and various types of information such as a menu screen. For example, the display monitor 130 includes various display devices such as a liquid crystal display device or an organic EL device. In addition to or instead of the display monitor 130, the digital camera 1 may include, for example, an electronic viewfinder (EVF) or the like being an example of another display in the camera body 100.

The user interface 150 is a generic term for a user interface that receives input of operation (instruction) from the user. When receiving user operation, the user interface 150 transmits an operation signal indicating various instructions according to the user operation to the camera controller 140. The user interface 150 includes, e.g., a physical button, a lever, a dial, a touch panel, and a switch. The user interface 150 may also include virtual buttons and icons displayed on the display monitor 130. A specific example of the user interface 150 will be described later.

The camera controller 140 controls operation of the entire digital camera 1 by controlling components such as the image sensor 110 according to instructions from the user interface 150. The camera controller 140 may include a hard-wired electronic circuit, or a microcomputer and the like that execute a program. The camera controller 140 transmits a vertical synchronization signal to the timing generator 112. In parallel with this, the camera controller 140 generates a synchronization signal synchronized with the vertical synchronization signal, and transmits the synchronization signal to the lens controller 230 via the body mount 160 and a lens mount 250. The camera controller 140 uses a RAM 141 as a work memory during control operations and image processing operations.

The flash memory 142 stores programs and parameters used when the camera controller 140 performs control.

The body mount 160 is mechanically and electrically connectable to the lens mount 250 of the interchangeable lens 200. The body mount 160 can transmit and receive data to and from the interchangeable lens 200 via the lens mount 250. The body mount 160 transmits an exposure synchronization signal received from the camera controller 140 to the lens controller 230 via the lens mount 250.

The body mount 160 transmits other control signals received from the camera controller 140 to the lens controller 230 via the lens mount 250. The body mount 160 transmits a signal received from the lens controller 230 to the camera controller 140 via the lens mount 250.

The card slot 170 is capable of mounting a memory card 171, and controls the memory card 171 based on control from the camera controller 140. The digital camera 1 can store image data into the memory card 171 and can read image data from the memory card 171.

1-2. Interchangeable Lens

As illustrated in FIG. 1, the interchangeable lens 200 is an example of an optical system including, for example, a focus lens 210, a zoom lens 220, a diaphragm 260, and the like. The interchangeable lens 200 further includes various drivers 211, 221, and 261, the lens controller 230, a RAM 231, a flash memory 232, and the lens mount 250. The interchangeable lens 200 may further include an image stabilizer lens in addition to the lens illustrated in FIG. 1.

The interchangeable lens 200 further includes operation members such as a focus ring 212 and a zoom ring 222, for example. The user interface of the interchangeable lens 200 is not limited thereto, and may include, for example, a button or the like provided on the exterior.

The lens controller 230 controls operation of the entire interchangeable lens 200. The lens controller 230 may include a hard-wired electronic circuit, or a microcomputer and the like that executes a program.

The RAM 231 functions as a work memory used when the lens controller 230 performs control. The flash memory 232 stores programs, parameters, lens data, and the like used for the control by the lens controller 230.

The zoom lens 220 is a lens for changing magnification of a subject image formed by the optical system of the interchangeable lens 200. The lens configuration of the zoom lens 220 may be any number of lenses or any number of groups. The zoom lens driver 221 is a mechanical mechanism that moves the zoom lens 220 along the optical axis of the optical system based on the operation of the zoom ring 222 by the user. The position of the zoom lens 220 is detected by the zoom lens position detector 223 as needed, and is notified to the lens controller 230.

The focus lens 210 is a lens for changing a focus state of a subject image incident from the optical system and formed on the image sensor 110. The lens configuration of the focus lens 210 may be any number of lenses or any number of groups. The focus lens driver 211 drives the focus lens 210 to move back and forth along the optical axis of the optical system based on the control of the lens controller 230. For example, the focus lens driver 211 can be implemented by a stepping motor, a DC motor, an ultrasonic motor, or the like.

The diaphragm 260 adjusts an amount of light incident on the image sensor 110. A diaphragm driver 262 drives the diaphragm 260 and controls size of an aperture of the diaphragm 260. The diaphragm driver 262 includes a motor or an actuator. For example, the lens controller 230 can manage the depth of field of the interchangeable lens 200 on the basis of an aperture value of the diaphragm 260, a zoom value of the zoom lens 220, and the like.

1-3. User Interface

Figure 2:
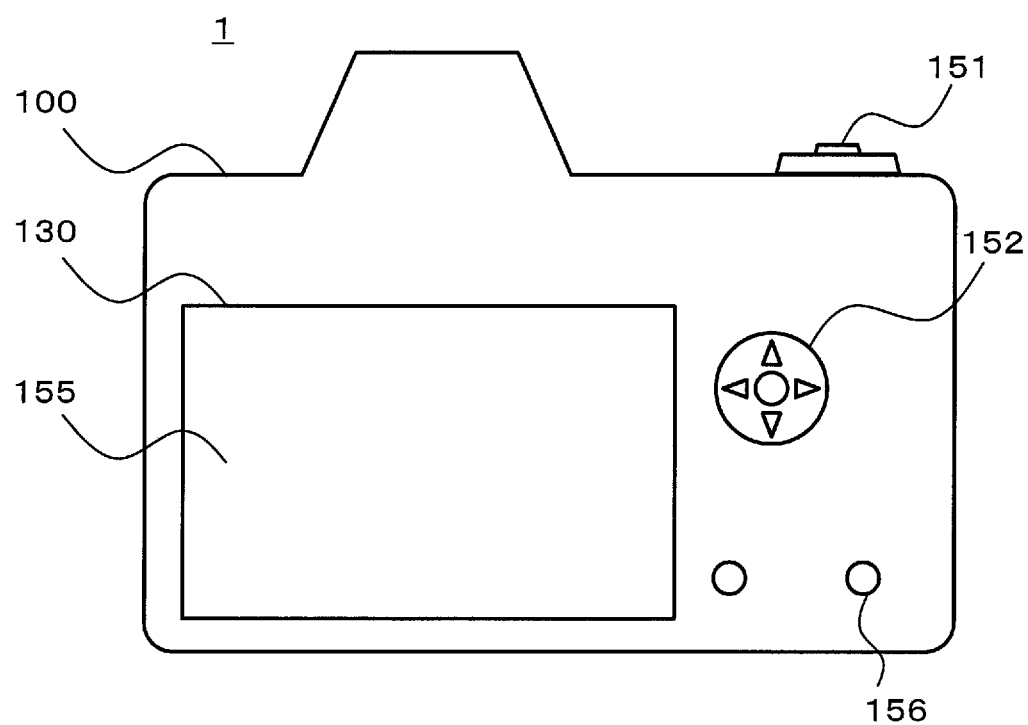
FIG. 2 is a diagram illustrating a back surface of the digital camera.

A specific example of the user interface 150 in the digital camera 1 will be described with reference to FIG. 2. FIG. 2 is a diagram illustrating a back surface of the camera body 100 of the digital camera 1.

FIG. 2 illustrates, as an example of the user interface 150, a release button 151, a selection button 152, a touch panel 155, and a function button 156. When receiving user operation, the user interface 150 transmits to the camera controller 140 various instruction signals.

The release button 151 is a two-stage press button. When the release button 151 is half-pressed by the user, the camera controller 140 executes autofocus control (AF control), auto exposure control (AE control), and the like. Further, when the release button 151 is fully pressed by the user, the camera controller 140 records image data captured at the timing of the press-down operation in the memory card 171 or the like as a recorded image.

The selection button 152 includes press buttons provided in the up, down, left, and right directions and a press button provided at the center. By pressing down the selection button 152 in any one of the up, down, left, and right directions, the user can select various condition items displayed on the display monitor 130 or can move a cursor. The digital camera 1 may include a joystick or the like that realizes a function similar to that of the selection button 152, for example.

When the user presses down a center button of the selection button 152 while the digital camera 1 is in an image capturing mode or a reproduction mode, the camera controller 140 displays a menu screen on the display monitor 130. The menu screen is a screen for setting various conditions for shooting/reproduction. In response to press-down of the center button with a setting item for various conditions being selected, the camera controller 140 determines setting of the selected item.

The touch panel 155 is disposed to overlap a display screen of the display monitor 130, and detects a touch operation on the display screen by a user's finger. As a result, the user can perform operations such as designation of an area for the image displayed on the display monitor 130 and various selections on the menu screen.

The function button 156 is a push button to which a specific function in the digital camera 1 is assigned in advance.

2. Operation

The operation of the digital camera 1 configured as described above will be described in the following.

2-1. Outline of Operation

The digital camera 1 has a touch AF function that is a function of controlling autofocus (AF) operation in accordance with user operation on the touch panel 155 of the user interface 150, for example. An outline of operation using the touch AF function in the digital camera 1 of the present embodiment will be described with reference to FIG. 3.

Figure 3:
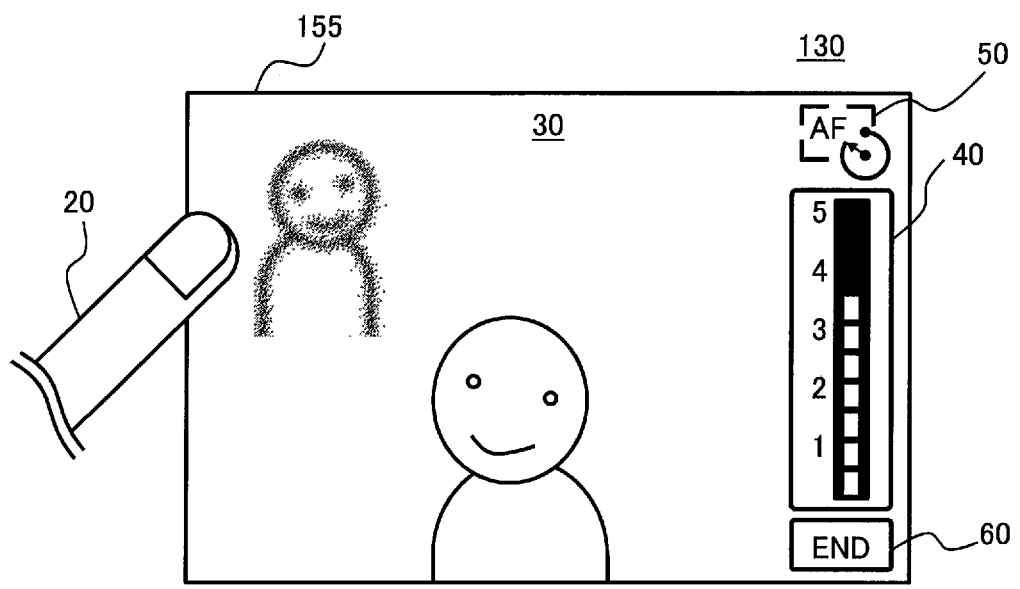
FIG. 3 is a diagram illustrating a display example of a live view screen in the digital camera according to the first embodiment.

FIG. 3 illustrates a display example of a live view screen of the digital camera 1 according to the present embodiment. For example, the digital camera 1 displays the live view image 30 on a live view screen displayed on the display monitor 130 during shooting or standby of a moving image. For example, in response to operation of the user touching a desired position on the live view image 30 with a finger 20, the digital camera 1 executes AF operation so as to focus on a subject located at the touched position, according to the touch AF function.

For example, as illustrated in FIG. 3, the digital camera 1 of the present embodiment displays an AF time bar 40, an AF time icon 50, and an end button 60 so as to be superimposed on the live view image 30 on the display monitor 130 of the live view screen.

The AF time bar 40 is an operation bar that is a bar-shaped virtual operation member for visualizing an AF transition period set in the digital camera 1 of the present embodiment. The AF transition period is a period within which a focusing state makes a transition for AF operation of the digital camera 1. The AF time bar 40 is an example of operation information for responding user operation to adjust the AF transition period.

For example, The AF time icon 50 is an operation icon for responding user operation to control starting of display of the AF time bar 40. The end button 60 is an operation button for responding user operation to end the display of the AF time bar 40. The digital camera 1 of the present embodiment can switch whether or not to display the AF time bar 40 on the live view screen.

For example, upon shooting a moving image using the touch AF function, when the user performs touch operation at a position desired to be focused on the live view image 30 during the shooting, it is possible to record an appearance in which the focusing state at the touch position or the like makes a transition in AF operation to be executed in moving image data. For example, as transition speed/delay of the focusing state has a useful video effect in a video work by moving image data, the user may have the demand to make an adjustment as intended.

In view of the above, the digital camera 1 of the present embodiment displays the AF time bar 40 together with the live view image 30 as described above, to respond to user operation for adjusting a length of the AF transition period. According to this, during shooting of a moving image using the touch AF function, the user can check or change, in the AF time bar 40, a length of the AF transition period applied at the time of the AF operation, with viewing a subject to be the target of the AF operation on the live view image 30, for example. As described above, the digital camera 1 of the present embodiment enables, by the touch AF function, for the user to easily adjust a speed of transition of a focusing state as intended, for example.

2-2. Details of Operation

Details of operation of the digital camera 1 in the present embodiment will be described with reference to FIGS. 4 to 5C.

Figure 4:
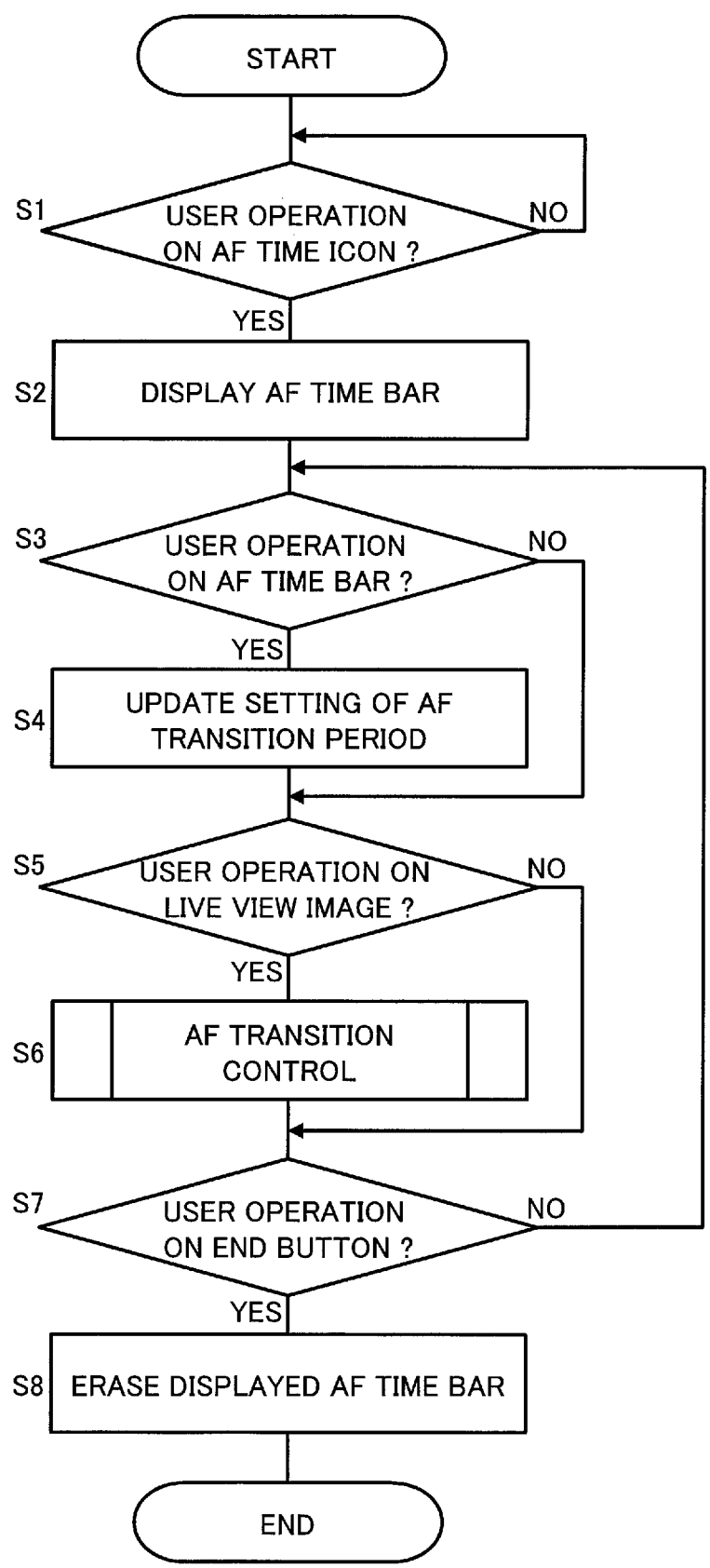
FIG. 4 is a flowchart exemplifying operation of the digital camera in the first embodiment.
Figure 5A:
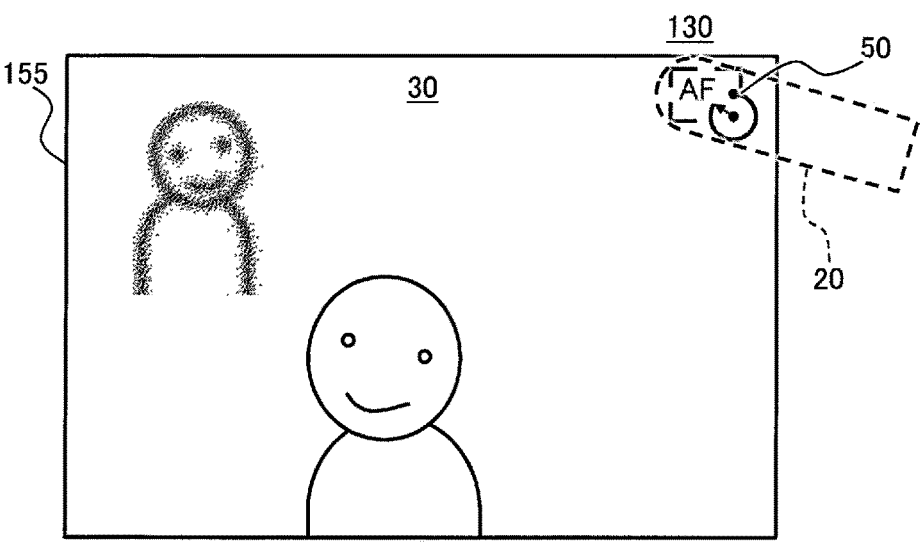
FIGS. 5A to 5C are diagrams for explaining operation of the digital camera in the first embodiment.
Figure 5B:
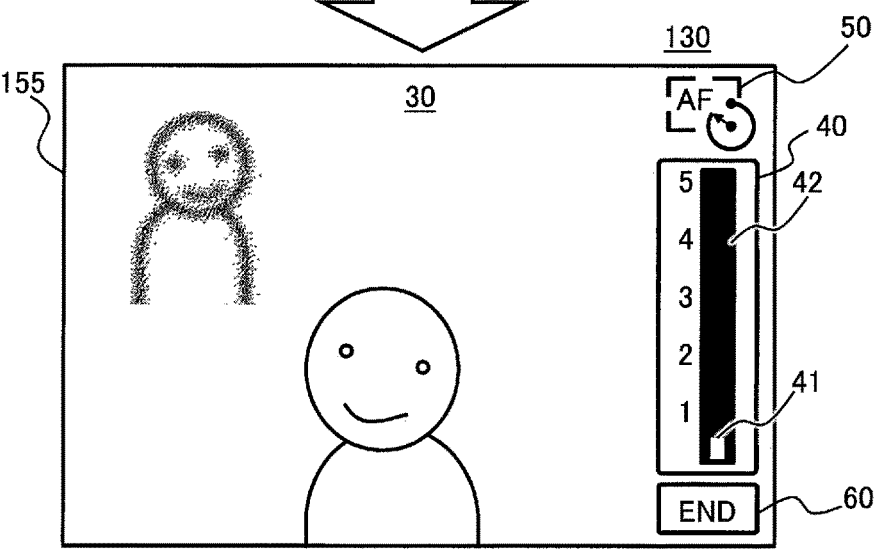

FIG. 4 is a flowchart exemplifying an operation of the digital camera 1 in the first embodiment. FIGS. 5A to 5C are diagrams for explaining the operation of the digital camera 1 in the present embodiment.

Processing illustrated in the flowchart of FIG. 4 is executed by the camera controller 140 simultaneously with imaging operation of a moving image, for example. This process may be performed during shooting and recording of a moving image or the like, or may be performed during shooting standby. FIG. 5A illustrates a live view screen displayed at the start of the process.

FIG. 5A illustrates an initial state of the live view screen in the digital camera 1 of the present embodiment. On the live view screen illustrated in FIG. 5A, the AF time icon 50 is displayed, but the AF time bar 40 and the end button 60 are not displayed.

At first, the camera controller 140 receives user operation of touching the AF time icon 50 via the touch panel 155 of the user interface 150 on the live view screen illustrated in FIG. 5A, for example (S1). Step S1 is performed, as the input target, user operation for starting display of the AF time bar 40 with the live view image 30 being displayed.

When operation on the AF time icon 50 is input (YES in S1), the camera controller 140 controls the display monitor 130 to display the AF time bar 40 (S2). FIG. 5B illustrates a display example of Step S2.

FIG. 5B illustrates a state in which the AF time icon 50 is operated from FIG. 5A. The display monitor 130 further displays the AF time bar 40 and the end button 60 in addition to the AF time icon 50, by the control of the camera controller 140 (S2). In the present example, a display position of the AF time bar 40 is preset at a predetermined position, e.g. the right end in the horizontal direction of the live view screen.

In the example of FIG. 5B, the AF time bar 40 displays an initial value of the AF transition period. For example, the initial value of the AF transition period is stored in advance in the flash memory 142 as setting information. In the present example, the initial value of the AF transition period is set to a shortest time section in ranges settable by the AF time bar 40, and is displayed with one section block 41 corresponding to the time section. The initial value of the AF transition period is not particularly limited to the above, and may be a length of the AF transition period set in the past, for example.

For example, as illustrated in FIG. 5B, the camera controller 140 receives user operation of changing a length of the AF transition period via the user interface 150 such as the touch panel 155 in a state where the AF time bar 40 is displayed on the live view screen (S3). The target user operation in Step S3 is an example of first operation for adjusting the AF transition period using the AF time bar 40 as operation information. A display example of Step S3 is illustrated in FIG. 5C.

Figure 5C:
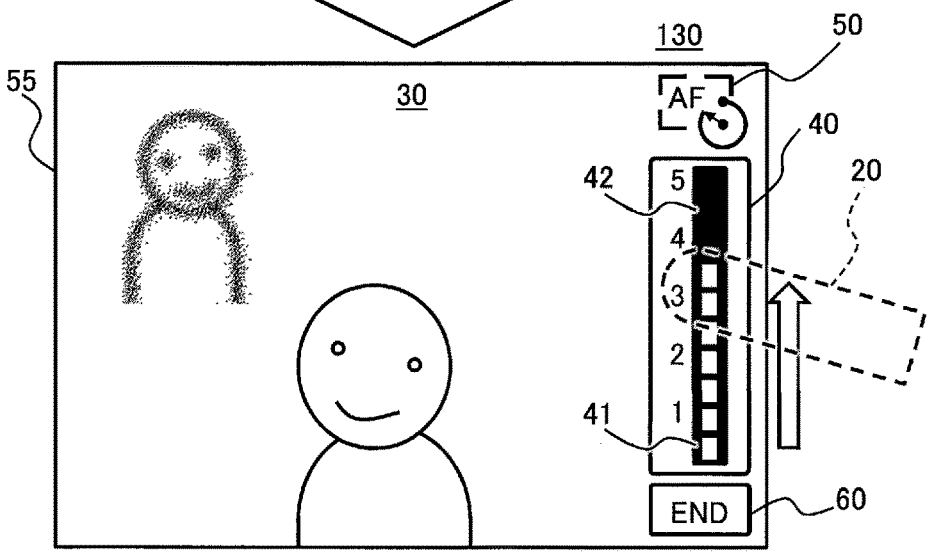

FIG. 5C illustrates a state in which the AF time bar 40 is operated from FIG. 5B. In the example of FIGS. 5B and 5C, the AF time bar 40 visualizes a length of the AF transition period set according to the number of the section blocks 41 arranged from the lower side to the upper side in a bar-shaped display region 42 extending in the vertical direction of the live view screen.

In the present example, the target user operation in Step S3 designates a vertical position corresponding to a length of the AF transition period desired by the user, by touch operation or the like in the display region 42 of the AF time bar 40. Then, the camera controller 140 updates the display of the AF time bar 40 so as to represent a length of the AF transition period according to the designated position (S4).

When the operation on the AF time bar 40 is input (YES in S3), the camera controller 140 updates setting of the AF transition period, according to the input operation (S4). For example, in addition to updating the display of the AF time bar 40 (FIG. 5C), the camera controller 140 updates setting information of the AF transition period in the flash memory 142 or the buffer memory 141.

The camera controller 140 receives user operation of designating a position on the live view image 30 by touch operation or the like on the live view image 30 via the touch panel 155, for example (S5). The target user operation in Step S5 is an example of second operation of instructing execution of the AF operation by position designation on the live view image 30.

When the operation of designating the position of the live view image 30 is input (YES in S5), referring to the setting information of the AF transition period, the camera controller 140 controls execution of the AF operation (S6). Such AF transition control (S6) is completed as the AF operation is executed according to the length of the AF transition period set in the AF time bar 40. At this time, the AF time bar 40 visualizes a progress state such as degree of progress of the AF operation in the AF transition period or remaining time (see FIGS. 7A to 7C). Details of the AF transition control (S6) will be described later.

On the other hand, when the operation on the AF time bar 40 is not input (NO in S3) or the touch operation of the live view image 30 is performed (YES in S5) in particular, the camera controller 140 applies a preset AF transition period such as an initial value to the processing of Step S6.

Further, the camera controller 140 operates to receive user operation touching the end button 60 via the touch panel 155, for example (S7). The target user operation in Step S7 is operation for ending display of the AF time bar 40.

When the operation of the end button 60 is input (YES in S7), the camera controller 140 controls the display monitor 130 to erase the display of the AF time bar 40 on the live view screen (S8). Accordingly, the live view screen returns from the state illustrated in FIG. 5C to the display similar in FIG. 5A.

On the other hand, when operation of the end button 60 is not input (YES in S7), the camera controller 140 repeats the processing of Step S3 and subsequent steps.

The camera controller 140 ends the processing illustrated in the present flowchart by erasing the display of the AF time bar 40 (S8). After the above, the camera controller 140 executes the processing of Step S1 and subsequent steps again after a predetermined cycle, for example. For example, in a case where touch operation on the live view image 30 is performed after Step S8, the camera controller 140 performs the AF operation according to the set AF transition period as in Step S6 in a state where the AF time bar 40 is not particularly displayed.

According to the above operation of the digital camera 1, when the AF time icon 50 is operated on the live view screen (YES in S1), the AF time bar 40 is displayed in addition to the live view image 30 (S2). Accordingly, the user can display the AF time bar 40 at any time when the user wants to check the AF transition period while shooting a moving image or during standby (see FIGS. 5A and 5B).

According to the digital camera 1 of the present embodiment, as the example illustrated in FIGS. 5B and 5C, the AF time bar 40 visualizes the set length of the AF transition period quantitatively, and the user operation of directly changing the visualized AF transition period can be received (S3). The AF time bar 40 as described above allows the user to easily adjust the length of the AF transition period as intended.

For example, by performing the touch operation on the live view image 30 with the AF time bar 40 being displayed, the user can check a state where the AF operation on a desired subject progresses according to the set AF transition period (S5 and S6). For example, the user can easily realize transition of a desired focusing state by trying the AF operation (S6) with repeating the operation (S5) of the AF time bar 40 during shooting standby.

Further, by operating the end button 60 with the AF time bar 40 being displayed (YES in S7), the user can control the AF time bar 40 not to display on the live view screen (S8). As described above, the user can switch the presence or absence of display of the AF time bar 40, so as to facilitate moving image shooting or the like in consideration of the AF transition period.

In the above description, the example in which Step S1 uses the touch operation on the AF time icon 50 is described. Step S1 is not particularly limited to touch operation, and the function button 156 (FIG. 2) may be used with a function of calling the AF time bar 40 or the AF time icon 50 being assigned, for example. Further, the target user operation in Step S7 is not particularly limited to touch operation of the end button 60, and may be pressing operation of the function button 156.

Further, the target user operation in Step S3 is not limited to the touch operation of the AF time bar 40 in particular, and may be operation of changing a setting value using the selection button 152 (FIG. 2), for example. The target user operation in Step S5 is not particularly limited to touch operation on the live view image 30. For example, the digital camera 1 may display a pointer movable by the selection button 152 on the live view image 30 to receive user operation of designating a position on the live view image 30.

2-2-1. AF Transition Control

The AF transition control in Step S6 of FIG. 4 will be described with reference to FIGS. 6 to 7.

Figure 6:
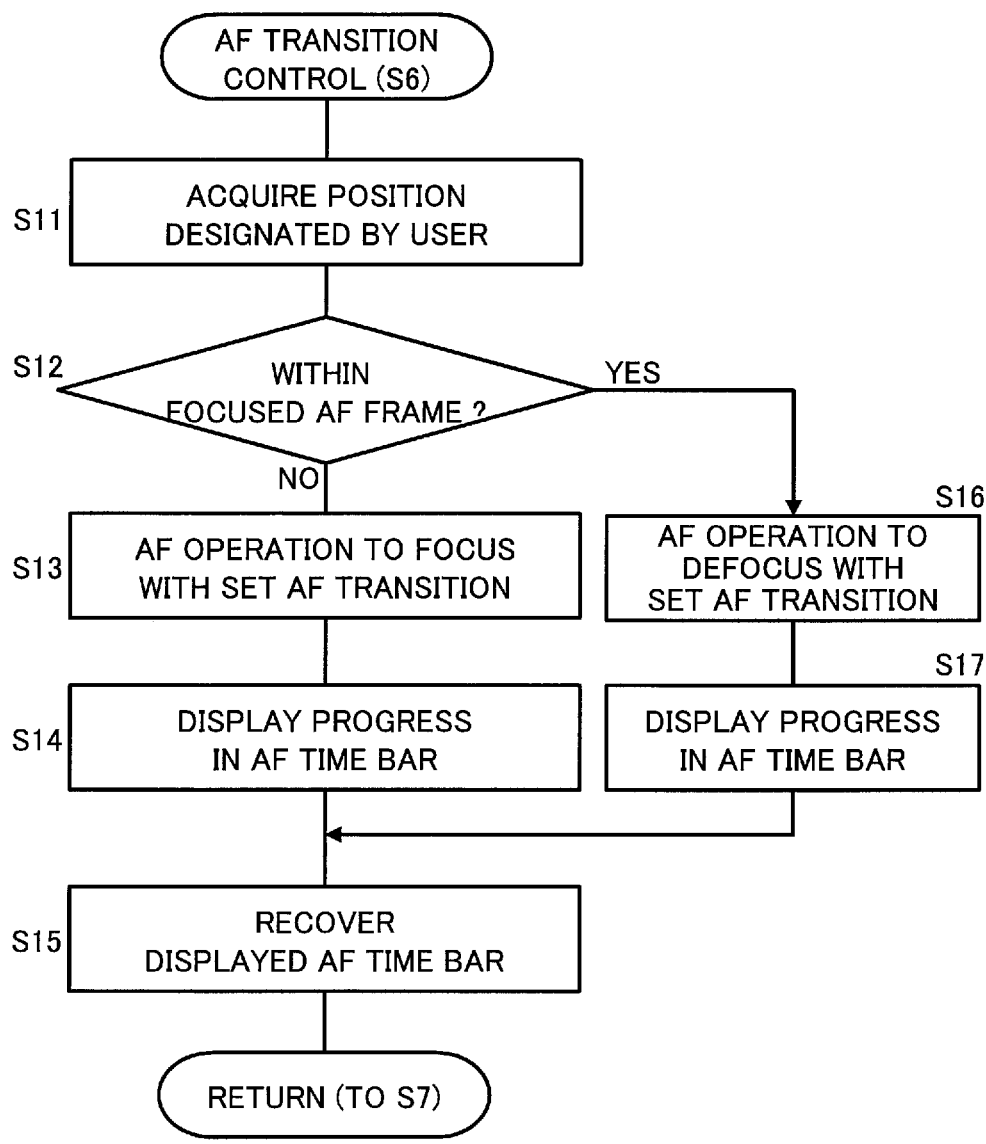
FIG. 6 is a flowchart for explaining AF transition control in the digital camera.
Figure 7A:
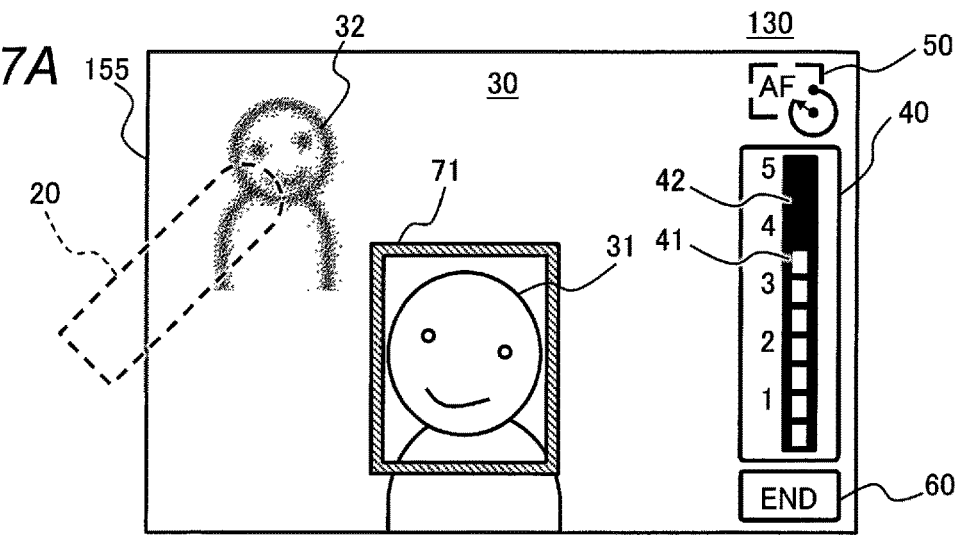
FIGS. 7A to 7C are diagrams illustrating a display example of the AF transition control in the digital camera.

FIG. 6 is a flowchart for explaining AF transition control (S6) in the digital camera 1. FIG. 7 illustrates a display example of the AF transition control in the digital camera 1. For example, the processing illustrated in the flowchart of FIG. 6 is started when touch operation is performed on the live view image 30 (YES in S5). FIG. 7A illustrates the live view screen displayed at the start of this process.

Figure 7B:
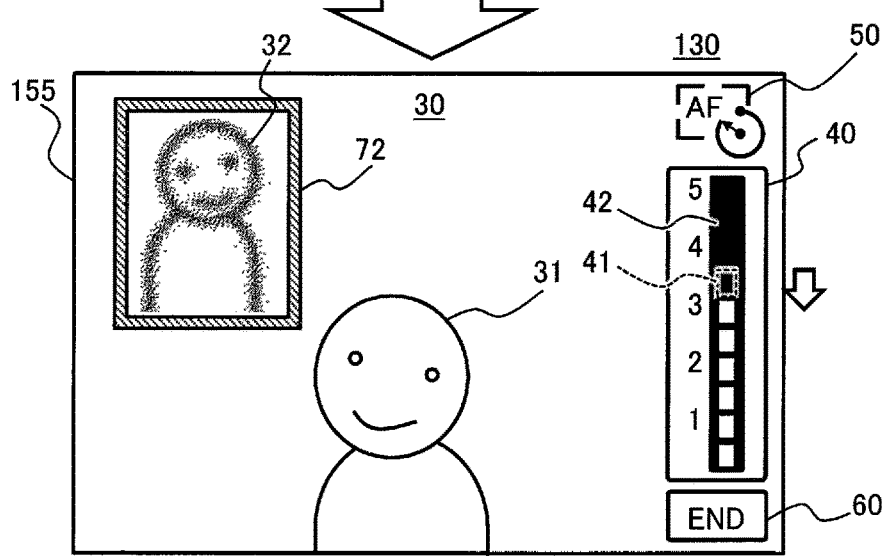
Figure 7C:
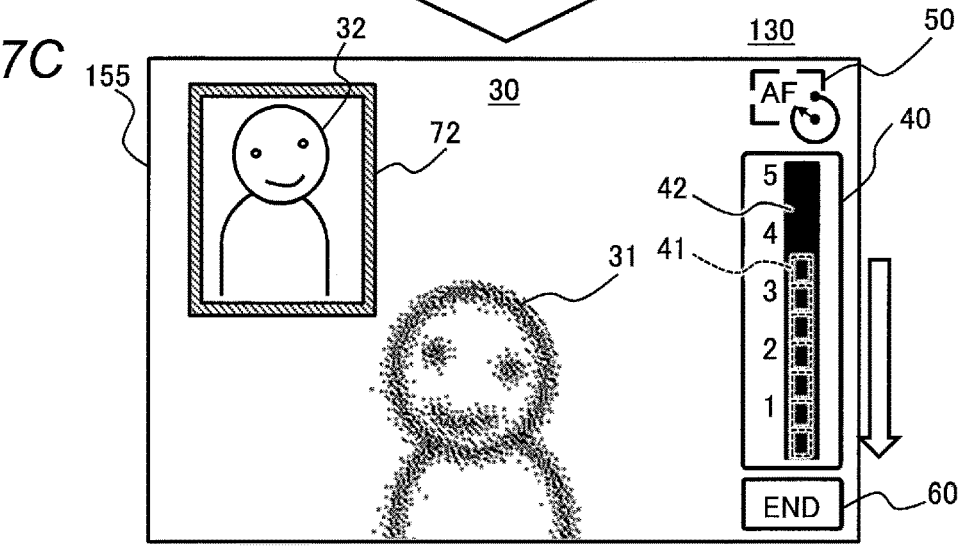

FIG. 7A illustrates a case where the user performs touch operation with the finger 20 with the digital camera 1 already focused on a subject 31. FIGS. 7A to 7C illustrate an operation example where the user performs touch operation for bringing the digital camera 1 into focus on a subject 32 different from the pre-focused subject 31.

In the flowchart of FIG. 6, at first, the camera controller 140 of the digital camera 1 acquires information indicating a touch position designated on the live view image 30 by touch operation, for example (S11). In the example of FIG. 7A, the camera controller 140 acquires information such as coordinates of a position touched by the subject 32 on the live view image 30, for example (311).

Next, the camera controller 140 determines whether or not the touch position on the live view image 30 is within a range of a focused AF frame, based on the acquired information on the touch position, for example (S12). The AF frame indicates a region set as a target of AF operation on the live view image 30, for example. In the example of FIG. 7A, an AF frame 71 is displayed on the focused subject 31. The processing in Step S12 is performed to determine whether or not the subject 32 designated by the user is the focused subject 31. For example, in the example of FIG. 7A, the camera controller 140 proceeds to NO in Step 312.

In a case where the touch position is out of the range of the focused AF frame 71 (NO in S12), the camera controller 140 executes AF operation for focusing on the subject 32 at the touch position (S13). For example, the AF operation in Step S13 is executed such that the subject 32 at the touch position is gradually focused over the AF transition period set in the AF time bar 40.

FIG. 7B illustrates a display example of the live view screen of the digital camera 1 after FIG. 7A. FIG. 7C further illustrates a display example of the live view screen after FIG. 7B. FIG. 7C corresponds to a timing at which the AF transition period elapses from the timing of FIG. 7A at which the touch operation is performed.

In Step S13 in response to the touch operation of FIG. 7A for example, the camera controller 140 sets an AF frame 72 for performing the AF operation on the subject 32 at the touch position around the touch position as illustrated in FIG. 7B, and erases the previous AF frame 71. For example, the camera controller 140 acquires a detection result of sensor pixels of the image surface phase detection method within a range corresponding to the region of the AF frame 72 on an image surface of the image sensor 110. Then, based on the detection result, the camera controller 140 calculates a focus position, a movement width or the like, corresponding to the position at which the focus lens 210 is focused on the subject 32.

Furthermore, in Step S13, the camera controller 140 moves the focus lens 210 from the current position to the focused position, based on the above calculation result. For example, the camera controller 140 controls the driving speed of the focus lens 210 to match a movement period with the set AF transition period wherein the movement period is a period until the focus lens 210 reaches the focused position. A detection result of the sensor pixel of the image surface phase detection method may also be acquired during movement of the focus lens 210 in the AF transition period. Based on the detection result, the camera controller 140 may change the driving speed or update a calculation result of the focused position and the like of the focus lens 210, during the AF transition period, for example. The AF operation in Step S13 can be implemented using a known technique (see, e.g. JP 2017-15871 A).

During the execution of the AF operation, the camera controller 140 performs display control so as to show a progress state of the AF operation in the AF time bar 40 (S14). For example, in the operation examples of FIGS. 7A to 7C, the camera controller 140 turns off the section blocks 41 one by one in order from the section blocks 41 on the upper side in the AF time bar 40 every time predetermined unit time elapses.

For example, under the control of the camera controller 140 (S14), the display monitor 130 in FIG. 7B decreases the number of the section blocks 41, which is turned on in the AF time bar 40, by one from the number thereof in FIG. 7A. Furthermore, at the timing after duration corresponding to the length of the AF transition period from FIG. 7A, as the subject 32 at the touch position is focused, the display monitor 130 turns off all the section blocks 41 in the AF time bar 40 as illustrated in FIG. 7C.

Thereafter, the camera controller 140 controls the display monitor 130 to return the display of the AF time bar 40, based on the setting information of the AF transition period, for example (S15). For example, after FIG. 7C, the display monitor 130 turns on a preset number of the section blocks 41 as in FIG. 7A, with the preset number corresponding to the length of the AF transition period set in advance.

Further, the user can designate the focused subject 31 by performing touch operation on the focused AF frame 71 on the live view image 30 (see S12, FIG. 7A). For example, in a case where the touch position is within the range of the focused AF frame 71 (YES in S12), the camera controller 140 performs AF operation for defocusing instead of the AF operation in Step S13 (S16).

In Step S16, the camera controller 140 controls the AF operation so as to defocus the focused subject 31 at the touch position over the AF transition period set in the AF time bar 40.

For example, during the AF transition period, the camera controller 140 moves the focus lens 210 from the current position thereof toward a movement direction set in advance as one of a far side directing the infinity end and a near side directing the closest. At this time, referring to the current depth of field in the digital camera 1, the camera controller 140 calculates a movement width and a movement speed of the focus lens 210 to be moved for defocusing during the AF transition period, for example.

Further, during the above defocusing AF operation, the camera controller 140 performs display control so that the AF time bar 40 shows a progress state of the AF operation as in Step S14 (S17).

When the camera controller 140 returns the display of the AF time bar 40 after the AF operation (S13 and S16) and the display control (S14 and S17) for the length of the AF transition period (S15), the processing of Step S6 in FIG. 4 ends, and the processing proceeds to Step S7, for example.

According to the above processing, transition of a focusing state where the subject 32 is in focus can be achieved at a timing after the elapse of a set AF transition period from an input timing of touch operation by the user to focus on the subject 32, for example (S13). At this time, as illustrated in FIGS. 7A to 7C, the AF time bar 40 can visualize a state in which the AF operation progresses (S17). According to this, the user can easily grasp how a focusing state makes a transition when the length of the AF transition period is set to a certain extent in the AF time bar 40, and can easily adjust the AF transition period as intended, for example.

The transition of the focusing state during the AF transition period is not limited to focusing on the subject 32 (S13), and is also applicable to defocusing from the subject 31 (S16). According to such defocusing AF operation (S16), the user can easily obtain transition of a focusing state in which the subject 31 is gradually defocused without using an advanced technique, for example.

In Step S16 described above, a moving direction of the focus lens 210 for the defocusing AF operation may be set by user operation. For example, in touch operation on the focused AF frame 71, the moving direction may be switched to the far side or the near side, according to predetermined user operation such as moving the finger 20 left and right, or performing tap operation or double tap operation. Alternatively, options of moving to the far side or the near side may be displayed at the time of touch operation on the AF frame 71.

Further, in the above description, the example of the AF control in the digital camera 1 of the present embodiment is described. However, the present disclosure is not particularly limited to this example. For example, image recognition may be used for the AF control. For example, the camera controller 140 may detect the subjects 31 and 32 by image recognition of the live view image 30, and set the AF frames 71 and 72 so as to enclose the subjects 31 and 32, based on the detection result (see FIGS. 7A and 7B). According to this, even if the subject 32, on which touch operation is performed, moves during the AF transition period, the camera controller 140 can cause the AF operation to follow the moving subject 32, for example. Thus, this can realize focusing over the AF transition period on the subject 31 that has moved.

Further, the digital camera 1 may perform candidate display for visualizing a subject detected in image recognition as a candidate for the AF target. The user operation on the live view image 30 at the time of executing AF (S5 in FIG. 4) may be operation in which the user designates a desired subject from among such candidate subjects.

3. Digest

As described above, the digital camera 1 (and the camera body 100) as an example of the imaging apparatus according to the present embodiment includes the image sensor 110 as an example of the image sensor, the display monitor 130 as an example of the display, the user interface 150 such as the touch panel 155, and the camera controller 140 as an example of the controller. The image sensor 110 captures a subject image via the interchangeable lens 200 as an example of the optical system including focus lens 210, to generate image data. The display monitor 130 displays the live view image 30 as an example of a moving image indicated by the image data. Operation of the user can be input to the user interface 150. The camera controller 140 controls focusing operation such as AF operation by the focus lens 210, based on user operation input to the user interface 150. The camera controller 140 controls the display monitor 130 to display the AF time bar 40, which is an example of the operation information indicating the AF transition period as an example of a setting value related to a speed at which the focusing operation is executed, together with the live view image 30 (S2). The camera controller 140 receives, by the user interface 150, the user operation (S3) of the AF time bar 40 as an example of the first operation to adjust a setting value indicated by the AF time bar 40, and the user operation (S5) of the live view image 30 as an example of the second operation to execute the focusing operation according to a setting value indicated by the AF time bar 40 displayed together with the live view image 30.

According to the digital camera 1 described above, the user can directly and quantitatively adjust a length of the AF transition period as a setting value in operation of the AF time bar 40 displayed together with the live view image 30, and intuitive setting of the AF transition period can be realized. In this way, the digital camera 1 of the present embodiment can facilitate setting regarding a speed, at which the AF operation is executed, for the user.

In the present embodiment, when the first operation is input to the user interface 150 (YES in S3), the camera controller 140 updates the setting value in accordance with the input first operation (S4), and displays the updated setting value on the AF time bar 40 (see FIG. 5C). When the second operation is input after the first operation (YES in S5), the camera controller 140 executes the focusing operation according to the updated setting value (S6). According to this, the user of the digital camera 1 can update a setting value with the AF time bar 40 and apply the updated setting value to the AF operation in a simple operation procedure. Thus, the user can easily set the AF transition period or the like.

In the present embodiment, the camera controller 140 controls the display monitor 130 to display a progress state in which the focusing operation is executed according to the setting value during execution of the focusing operation (S6), after the second operation is input (S14 and S17). According to this, the setting can be easily made as intended by the user, as how the AF operation is executed according to the setting value set by operation information such as the AF time bar 40 is visualized for the user.

In the present embodiment, the setting value of the AF time bar 40 indicates the AF transition period that is a period during which the focusing operation is executed. The camera controller 140 controls the display monitor 130 to display the progress state of the focusing operation in the AF transition period indicated by the setting value of the AF time bar 40 (FIGS. 7A to 7C). According to this, by visualizing, in the AF transition period of the AF time bar 40, a progress state in which the focusing operation is executed, the user's intention can be easily reflected in the setting of the AF transition period.

In the present embodiment, in a state where the live view image 30 is displayed on the display monitor 130, the camera controller 140 receives, via the user interface 150, the user operation (S1) to display the AF time bar 40 and the user operation (S7) to erase the displayed AF time bar 40. According to this, the user can selectively display the AF time bar 40 when the user wants to check the AF time bar 40 while viewing the live view image 30. Thus, the user can easily perform setting using the AF time bar 40.

In the present embodiment, the user operation (S5) of the live view image 30, which is an example of the second operation, designates a subject in the live view image 30 by a position touched on the live view image 30 in the touch operation, for example. When the second operation is input, the camera controller 140 moves the focus lens 210 from a current position so that a designated subject is focused according to a setting value indicated by the AF time bar 40 (S13). Accordingly, the user can execute focusing reflecting the setting value such as the AF transition period by simple operation of designating a desired subject on the live view image 30, and can easily use the AF operation.

In the present embodiment, in a case where the subject designated by the second operation is a focused subject (NO in S12), when the second operation is input, the camera controller 140 moves the focus lens 210 from a current position so that the designated subject is not focused according to the setting value indicated by the AF time bar 40 (S16). According to this, the user can use the AF operation reflecting the setting value even when defocusing from a desired subject.

Second Embodiment

In a second embodiment, the digital camera 1 allowing the AF time bar 40 to have a variable display position will be described with reference to FIGS. 8 to 9D.

Hereinafter, the digital camera 1 according to the present embodiment will be described, but a configuration and operation similar to those of the digital camera 1 according to the first embodiment will be omitted from description appropriately.

Figure 8:
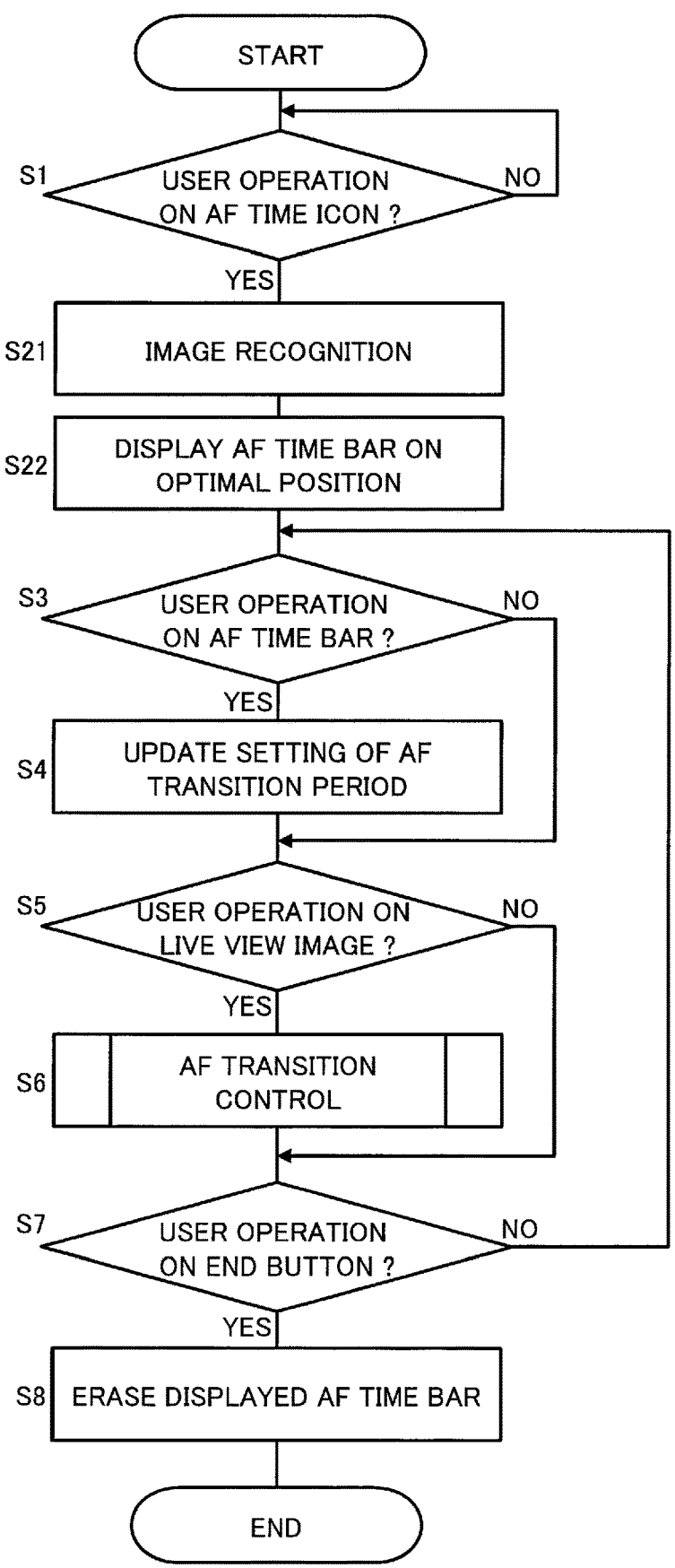
FIG. 8 is a flowchart exemplifying operation of the digital camera according to a second embodiment.

FIG. 8 is a flowchart exemplifying operation of the digital camera 1 according to the second embodiment. FIGS. 9A to 9D are diagrams for explaining operation of the digital camera in the present embodiment.

Figure 9A:
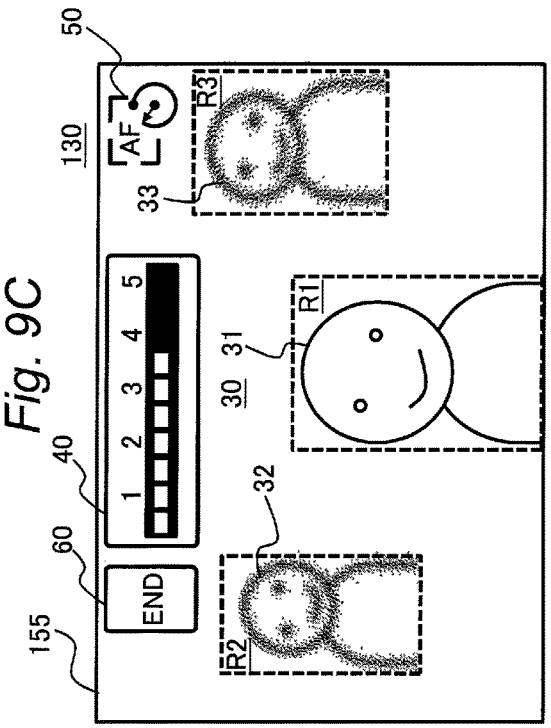
FIGS. 9A to 9D are diagrams for explaining operation of the digital camera in the second embodiment.

In the digital camera 1 of the present embodiment, the camera controller 140 performs the processing of Steps S1 and S3 to S8 similarly to the first embodiment, for example. For example, instead of Step S2 in FIG. 4, the camera controller 140 of the present embodiment performs processing for optimizing a display position of the AF time bar 40 as illustrated in FIG. 8 (S21 and S22). FIG. 9A exemplifies a live view screen before the AF time bar 40 is displayed (S1) in the digital camera 1 of the present embodiment.

In the first embodiment, the AF time bar 40 is displayed at the predetermined position such as the right end of the live view screen (see S2 in FIG. 4, FIG. 5, and the like). In the example of FIG. 9A, a subject 33 is located at the right end on the live view image 30. In this case, when the AF time bar 40 is displayed at the right end, the AF time bar 40 is superimposed on the subject 33. Then, even if the user wants to focus on the subject 33, it may be difficult to perform touch operation or the like on the subject 33 due to the superimposition of the AF time bar 40, for example.

In view of the above, the digital camera 1 of the present embodiment optimizes the display position of the AF time bar 40 in order not to superimpose on the subjects 31 to 33 by image recognition of the live view image 30, for example (S21 and S22). The target of such image recognition is set in advance to a type of subject presumed to have possibility to be designated as an AF target by a user of the digital camera 1 or the like, according to a shooting scene thereof, for example. For example, it is possible to set the recognition target with the shooting scene being a concert is a person, and the recognition target with the shooting scene is scenery is a natural object such as a tree. Such a shooting scene may also be determined by image recognition by the digital camera 1, or may be user setting such as a setting menu.

For example, when the AF time icon 50 is operated from the state of FIG. 9A (YES in S1), the camera controller 140 recognizes positions of the subjects 31 to 33 in the live view image 30 (S21). Next, based on the recognized positions of the subjects 31 to 33, the camera controller 140 selects an optimal display position from a plurality of candidate positions indicating candidates for displaying the AF time bar 40 for example, to control the display monitor 130 to display the AF time bar 40 (S22). For example, the candidate positions of the AF time bar 40 are both left and right ends of the live view image 30. An operation example of Steps S21 and S22 is illustrated in FIG. 9B.

Figure 9C:
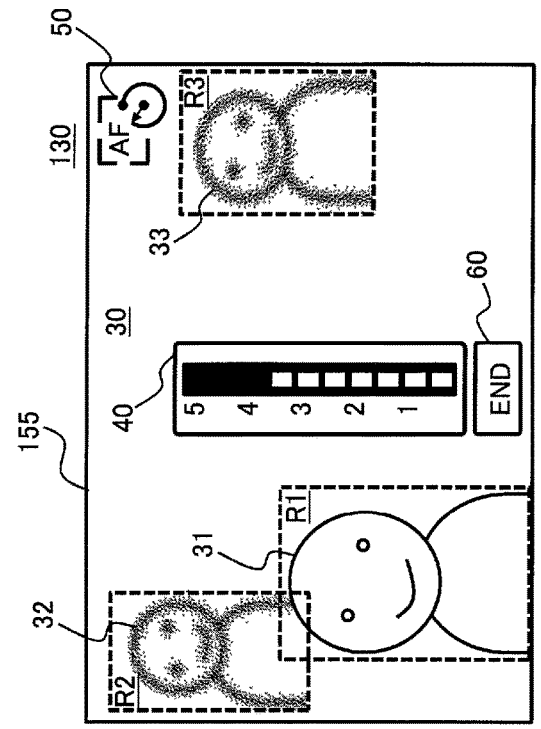
Figure 9B:
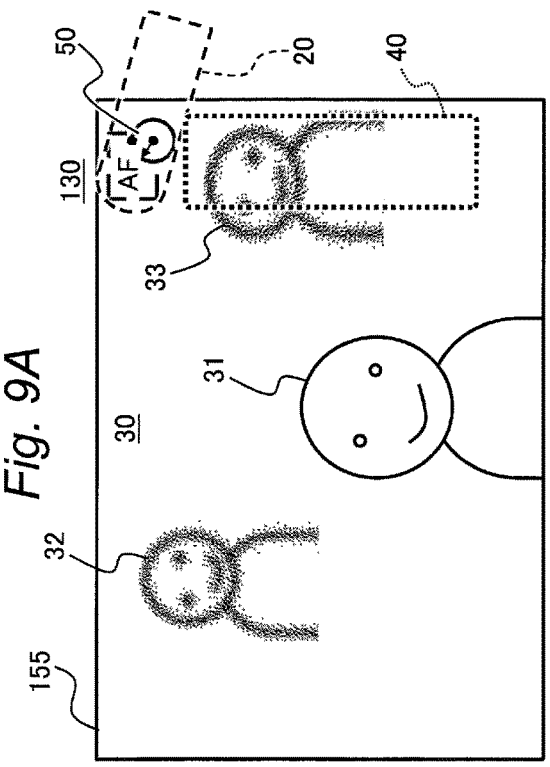

FIG. 9B exemplifies a state in which the AF time bar 40 is displayed from FIG. 9A. FIG. 9B exemplifies subject regions R1, R2, and R3 obtained as a result of the image recognition in Step S21. For example, the camera controller 140 checks superimposition of each candidate position and the subject regions R1 to R3 in a predetermined priority order among the plurality of candidate positions, and determines a display position of the AF time bar 40 (S22).

The example of FIG. 9B exemplifies a case where the left end of the live view image 30, which is set to have a lower priority than the right end, is not superimposed on the subject regions R1 to R3, and thus is determined to be a display position of the AF time bar 40. This makes it easy for the user to perform touch operation for setting the subjects 31 to 33 as AF targets with checking the AF time bar 40.

The display position and the candidate position of the AF time bar 40 are not particularly limited to the above, and may be various positions. Such a variation will be described with reference to FIGS. 9C to 9D.

FIG. 9C exemplifies a case where a display position of the AF time bar 40 is the upper end of the live view image 30. For example, the candidate positions of the AF time bar may include the upper end and the lower end of the live view image 30. In this case, the AF time bar 40 is set to lie in the horizontal direction as illustrated in FIG. 9C instead of the vertical direction, for example. According to this, the AF time bar 40 can be displayed along an end portion of the live view image 30, and superimposition with the subjects 31 to 33 can be suppressed.

Figure 9D:
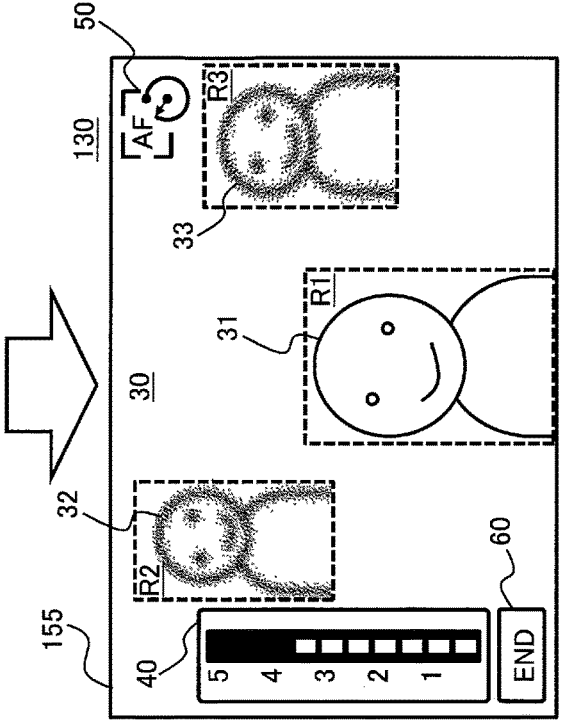

FIG. 9D exemplifies a case where the display position of the AF time bar 40 is at the center of the live view image 30. A candidate position of the AF time bar 40 is not necessarily limited to an end portion of the live view image 30. For example, as illustrated in FIG. 9D, in a case where a place where the subjects 31 to 33 is not located on the live view image 30 is the center of the screen, the AF time bar 40 may be displayed at the place.

The optimization of a display position of the AF time bar 40 as described above is not limited to be performed at the start of displaying the AF time bar 40 (S1, S21, and S22), and may be performed in a state where the AF time bar 40 is already displayed.

For example, while the AF time bar 40 is displayed (S3 to S7), the camera controller 140 operates to receive the user operation of the AF time icon 50 as in Step S1. When the AF time icon 50 is operated, the camera controller 140 performs image recognition of the live view image 30 as in Step S21, and changes a position of the AF time bar 40 to an optimal display position, based on the a recognition result. Accordingly, the user can optimize the display position of the AF time bar 40 by operating the AF time icon 50 whenever the user wants to change the display position of the AF time bar 40.

Further, the optimization of the display position of the AF time bar 40 may be performed without particularly using the user operation of the AF time icon 50. For example, the camera controller 140 may automatically change the display position of the AF time bar 40 when determining that the subject regions R1 to R3 are superimposed on the AF time bar 40 by image recognition of the live view image 30 sequentially, regardless of user operation in particular.

Further, change in the display position of the AF time bar 40 does not require image recognition in particular, and may be performed by user's operation of arranging the AF time bar 40 at a desired position, for example. For example, the camera controller 140 may be respond the user operation dragging the displayed AF time bar 40 for moving the AF time bar 40 to a desired end portion, to move the display position of the AF time bar on the desired end portion, according to the user operation.

As described above, in the digital camera 1 of the present embodiment, the AF time bar 40 is displayed at a display position superimposed on the live view image 30 on the display monitor 130. The display position of the AF time bar 40 is changed according to positions of the subjects 31 to 33 in the live view image 30. According to this, the AF time bar 40 can be displayed without making it difficult to designate the subjects 31 to 33 in the live view image 30. Thus, the setting using the AF time bar 40 can be facilitated.

In the present embodiment, the camera controller 140 recognizes positions of the subjects 31 to 33 in the live view image 30 (S21), and controls the display position of the AF time bar 40, based on the recognized positions of the subjects 31 to 33 (S22). According to this, the display position of the AF time bar 40 can be optimized on the basis of image recognition. Additionally or alternatively to such image recognition, the camera controller 140 may respond user operation via the user interface 150 to change the display position of the AF time bar 40.

OTHER EMBODIMENTS

As described above, the first and second embodiments are described as an example of the technique disclosed in the present application. However, the technique in the present disclosure is not limited thereto, and can also be applied to embodiments in which changes, substitutions, additions, omissions, and the like are made as appropriate. Further, the constituent elements described in the above-described embodiments can also be combined to form a new embodiment. Thus, in the following, other embodiments will be exemplified.

In the first and second embodiments described above, the AF time bar 40 indicating a length of the AF transition period for each of the section blocks 41 is exemplified. In the present embodiment, the AF time bar 40 does not particularly need to use the section block 41, and for example, a length of the AF transition period may be continuously changed. Such a variation will be described with reference to FIGS. 10 to 11.

Figure 10:
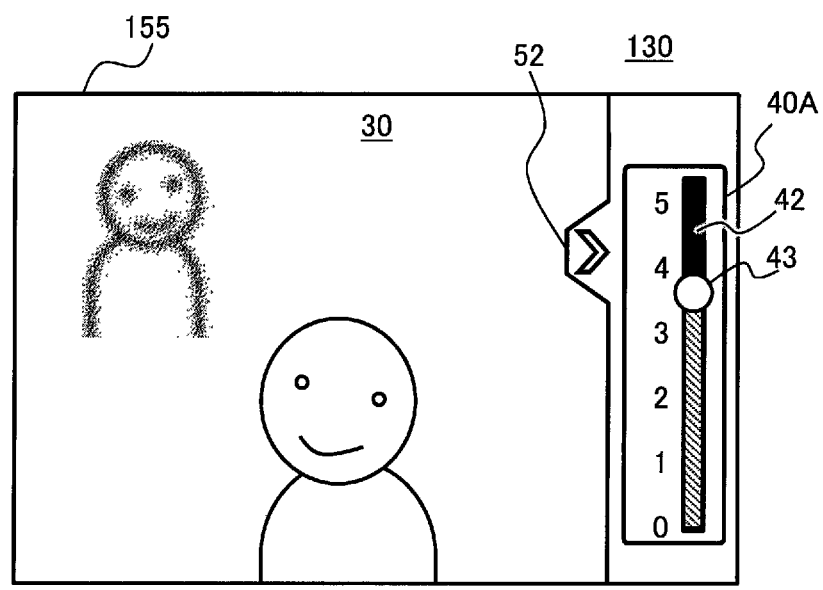
FIG. 10 is a diagram illustrating a live view screen in a first variation of the digital camera.

FIG. 10 exemplifies a live view screen in a first variation of the digital camera 1. In the example of FIG. 10, an AF time bar 40A continuously shows a setting length of the AF transition period according to a position of a pointer 43 with respect to a scale attached to the display region 42. In the AF time bar 40A, a bar graph may be extended from the lower end of the display region 42 or the like without displaying the pointer 43 in particular. Further, the scale of the AF time bar 40A may be omitted.

Figure 11:
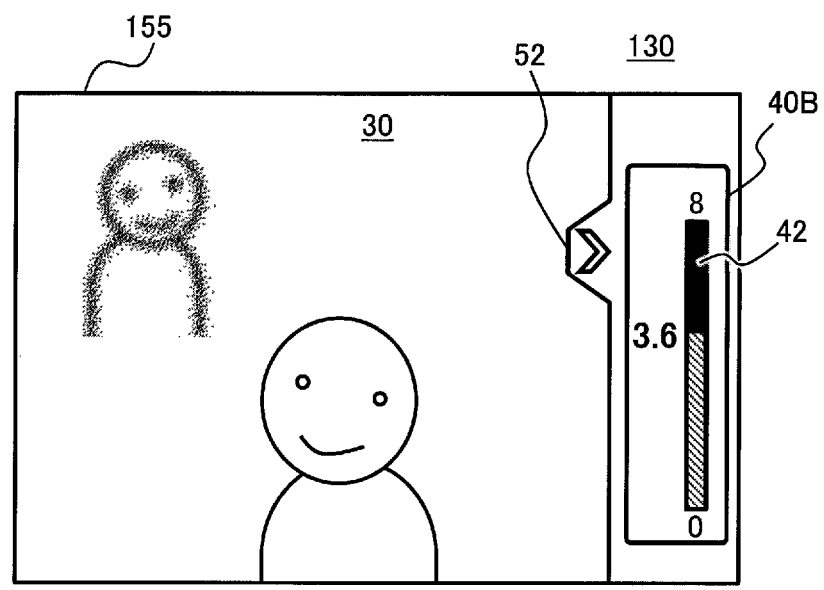
FIG. 11 is a diagram illustrating a live view screen in a second variation of the digital camera.

FIG. 11 exemplifies a live view screen in a second variation of the digital camera 1. In the example of FIG. 11, an AF time bar 40B indicates a length of the AF transition period by a bar graph extending in the display region 42 and a numerical value corresponding to the bar graph. The unit of numerical value display of the AF transition period is e.g. seconds.

In the examples of FIGS. 10 and 11, an operation tab 52 is displayed with the AF time icon 50 and the end button 60 (FIG. 3) being omitted. In the digital camera 1 of the present variation, the operation tab 52 switches the presence or absence of the AF time bar 40, according to touch operation of pulling out the AF time bar 40 from an end portion of the live view screen or returning thereto, for example.

In the above embodiments, the operation example is exemplified where the digital camera 1 moves the focus lens 210 from the current position in the AF transition period set in the AF time bar 40 according to the second operation instructing execution of the AF operation A variation of operation of the digital camera 1 will be described with reference to FIG. 12.

Figure 12:
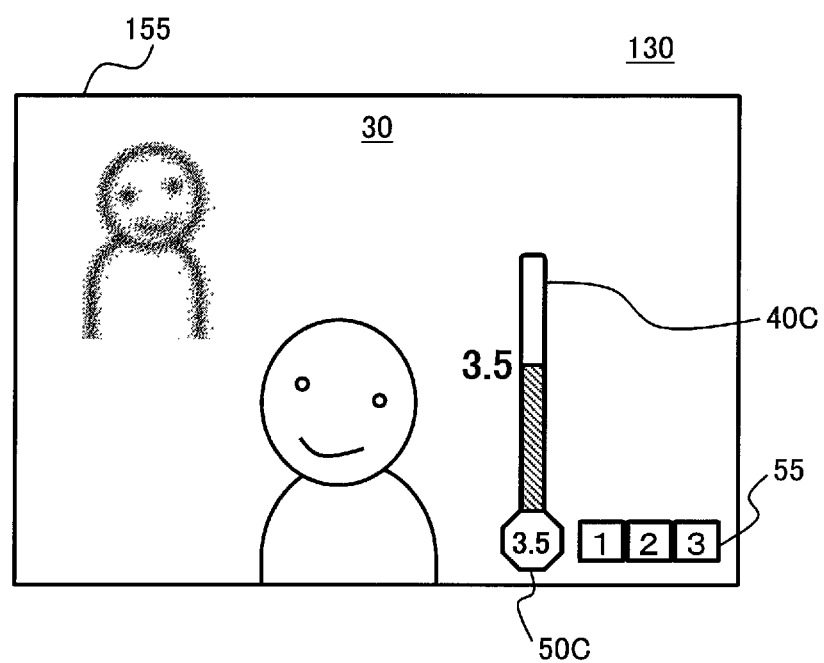
FIG. 12 is a diagram illustrating a live view screen in a third variation of the digital camera.

FIG. 12 exemplifies a live view screen in a third variation of the digital camera 1. In the present variation, as exemplified in FIG. 12, the camera controller 140 causes the display monitor 130 to display an AF time icon 50C, an AF time bar 40C, and a focus position icon 55.

The focus position icon 55 is an operation icon indicating positions of a plurality of the focus lenses 210 registered in advance. In digital camera 1 of the present variation, a focus lens position corresponding to a desired focusing state can be registered by the user in advance in menu setting or the like, for example. FIG. 12 illustrates an example of the focus position icon 55 in which three focus lens positions are registered, but the present disclosure is not particularly limited to this example. Various numbers of focus position icons can be registered.

The AF time bar 40C of the present variation visualizes the AF transition period for movement between the plurality of focus lens positions registered in the focus position icon 55, to receive user operation by which the user can make adjustment, similarly to the first embodiment. Further, in the example of FIG. 12, the camera controller 140 switches whether or not to display the AF time bar 40 in response to touch operation on the AF time icon 50C. For example, even when the AF time bar 40C is not displayed, a numerical value of the set AF transition period is displayed in the AF time icon 50C.

The digital camera 1 according to the present variation receives user operation for designating a desired start position and a desired end position from among the plurality of registered focus lens positions, by touch operation on the focus position icon 55, for example. In response to user operation on the focus position icon 55, the digital camera 1 of the present variation performs AF operation such that movement of the focus lens 210 between the designated start position and end position is the length of the AF transition period set by the AF time bar 40C. In the AF operation in this case, at first, the focus lens 210 is moved from a current position of the focus lens 210 to the designated start position at a predetermined driving speed such as a fastest speed. Then, the movement transitions to movement achieving to the end position for the AF transition period. Such AF operation can be performed by driving the focus lens 210 without particularly using a detection result of a sensor pixel or the like.

For example, for obtaining a video effect that makes a transition to a focusing state at the end position after switching to the focusing state at the start position registered in advance during, moving image shooting, the user can adjust a length of the AF transition period to a desired length by the AF time bar 40C on the live view screen. According to the AF time bar 40C of the present variation, the user can easily adjust the AF transition period between various focus lens positions registered in the focus position icon 55. Further, movement of the focus lens 210 to a start position may also be performed over the set AF transition period as in the first embodiment and the like.

As described above, in the digital camera 1 according to the present embodiment, the second operation for instructing execution of AF operation may designate a start position and an end position for moving the focus lens 210. When the second operation is input, the camera controller 140 may move the focus lens 210 from the start position to the end position according to the setting value indicated by the AF time bar 40. According to the AF time bar 40C of the present embodiment, the AF transition period between various start positions and end positions can be adjusted. This also makes it easy for the user to set a speed at which AF operation is executed.

In the above embodiments, the AF time bar 40 is exemplified as the example of the operation information in the digital camera 1, but the operation information is not particularly limited to this. In the present embodiment, the operation information in the digital camera 1 may be an indicator indicating a length of the AF transition period with a numerical value, instead of the bar display such as the AF time bar 40, wherein the length of the AF transition period may be adjusted by the user operation for designating a numerical value. In this case, a progress state during AF operation may be displayed so as to count down from the numerical value of the length of the set AF transition period. Further, the operation information of the present embodiment may be clock-like display, instead of bar-like display such as the AF time bar 40.

In the above embodiments, the example of displaying the progress state of AF operation in the operation information such as the AF time bar 40 is described, but the present disclosure is not particularly limited to this. In the digital camera 1 of the present embodiment, a progress state of AF operation may be displayed as information separate from the operation information. For example, dedicated display for visualizing the progress state of AF operation may appear at the start of the AF operation in various modes such as a clock or an hourglass.

In the above embodiments, the example is described where the AF time bar 40 is displayed to be superimposed on the live view image 30. In the digital camera 1 of the present embodiment, display of the AF time bar 40 is not necessarily superimposed on the live view image 30. For example, the display monitor 130 of the digital camera 1 may provide a region where the live view image 30 is not displayed in an end portion of the live view screen, and display the AF time bar 40 in the region. This also realizes a live view screen that simultaneously displays the AF time bar 40 together with the live view image 30.

In the above embodiments, the AF time bar 40, which shows the setting value of the AF transition period, is described as an example of the operation information, but the operation information is not limited to this. In the digital camera 1 of the present embodiment, a setting value of the operation information is not limited to the AF transition period, and may be a driving speed of the focus lens 210, for example.

In the present embodiment, it may be switched between the operation information of time setting such as the AF time bar 40 and the operation information of speed setting for adjusting a setting value of a driving speed. For example, when the interchangeable lens 200 connected to the camera body 100 is difficult to perform drive control of the focus lens 210 for which the AF transition period is set, the camera controller 140 may employ the operation information of speed setting instead of the operation information of time setting, based on data communication with the interchangeable lens 200. Alternatively, in a setting menu or the like, user operation of selecting the operation information to be displayed on a live view screen from time setting or speed setting may be received. With this, the user can select appropriate operation information in considering a video effect desired to be obtained by transition of a focusing state.

Furthermore, in the present embodiment, the digital camera 100 may allow the user to set preference regarding the AF transition by the setting menu or the like, for example.

The user preference may be preset such that in the AF transition period, the speed is higher at the start of the AF operation and lower at the end of the AF operation, or vice versa, the speed is lower at the start and higher at the end, for example. Based on the preset user preference, when the AF transition period is set to 4 seconds or the like in the AF time bar 40, the digital camera 100 performs the AF transition control to distribute the driving speed of the focus lens 210 within the 4 seconds adequately. According to this, it is possible to further facilitate the AF transition to be closer to the intention of the user.

In the above embodiments, the example is described where the AF technique of the image surface phase detection method is used in the digital camera 1 The digital camera 1 according to the present embodiment may use another AF technique such as a contrast method in combination with the image surface phase detection method, for example. Further, the digital camera 1 of the present embodiment does not necessarily use the image surface phase detection method, and a technique capable of acquiring a focus position at various positions on an image surface of the image sensor 110 may also be used instead, e.g., a DFD technique may be used.

In the above embodiments, an interchangeable lens type digital camera is described as an example of the imaging apparatus, but the imaging apparatus of the present embodiment may be not in particular an interchangeable lens type digital camera. In addition, the idea of the present disclosure may be applied not only to a digital camera but also to a movie camera, and can also be applied to an electronic apparatus having various imaging functions such as a mobile phone or a PC with a camera.

The present disclosure is applicable to various imaging apparatuses that perform focusing operation.

The invention claimed is:

1. An imaging apparatus comprising:
   an image sensor that captures a subject image via an optical system including a focus lens, to generate image data;
   a display that displays a moving image indicated by the image data;
   a user interface allowing to input user operation; and
   a controller that controls focusing operation using the focus lens, based on the user operation input to the user interface, wherein
   the controller
   controls the display to display operation information together with the moving image, the operation information indicating a setting value related to a speed at which the focusing operation is executed, and
   responds to first operation via the user interface to adjust the setting value indicated by the operation information, and responds to second operation via the user interface to execute the focusing operation in accordance with the setting value indicated by the displayed operation information together with the moving image, wherein
   the controller controls the display to display a progress state during execution of the focusing operation, after the second operation is input, the progress state indicating how much the focusing operation according to the setting value is progressing.

2. The imaging apparatus according to claim 1, wherein when the first operation is input to the user interface, the controller updates the setting value in accordance with the input first operation to display an updated setting value in the operation information, and when the second operation is input after the first operation, the controller executes the focusing operation according to the updated setting value.

3. The imaging apparatus according to claim 1, wherein
the setting value of the operation information indicates a period during which the focusing operation is executed, and
the controller controls the display to display the progress state of the focusing operation in the period indicated by the setting value of the operation information.

4. The imaging apparatus according to claim 1, wherein
the operation information is displayed at a display position superimposed on the moving image on the display, and
the controller controls the display to change the display position of the operation information, according to a position of a subject in the moving image.

5. The imaging apparatus according to claim 1, wherein
with the moving image being displayed on the display, the controller responds to specific user operation via the user interface to display the operation information, and responds to further user operation via the user interface to erase the displayed operation information.

6. The imaging apparatus according to claim 1, wherein
the second operation designates a subject in the moving image, and
when the second operation is input, the controller moves the focus lens from a current position, to focus on the designated subject according to the setting value indicated by the operation information.

7. The imaging apparatus according to claim 6, wherein
in a case where the subject designated by the second operation is a focused subject,
when the second operation is input, the controller moves the focus lens from the current position, to defocus the designated subject according to the setting value indicated by the operation information.

8. An imaging apparatus, comprising:
an image sensor that captures a subject image via an optical system including a focus lens, to generate image data;
a display that displays a moving image indicated by the image data;
a user interface allowing to input user operation; and
a controller that controls focusing operation using the focus lens, based on the user operation input to the user interface, wherein
the controller
controls the display to display operation information together with the moving image, the operation information indicating a setting value related to a speed at which the focusing operation is executed, and
responds to first operation via the user interface to adjust the setting value indicated by the operation information, and responds to second operation via the user interface to execute the focusing operation in accordance with the setting value indicated by the displayed operation information together with the moving image, wherein
the second operation designates a start position and an end position, the start position being a focus lens position to start moving the focus lens and the end position being a focus lens position to end the moving of the focus lens, and
when the second operation is input, the controller moves the focus lens from the start position to the end position, according to the setting value indicated by the operation information.

\* \* \* \* \*